United States Patent [19]

Miyamoto et al.

[11] Patent Number: 4,999,144
[45] Date of Patent: Mar. 12, 1991

[54] PRESSURE SELF-COMBUSTION SINTERING METHOD

[75] Inventors: Yoshinari Miyamoto, Kawanishi; Hirohiko Nakata, Itami, both of Japan

[73] Assignees: Osaka University; Sumitomo Electric Industries, Ltd., both of Osaka, Japan

[21] Appl. No.: 263,245

[22] Filed: Oct. 27, 1988

[30] Foreign Application Priority Data

Oct. 30, 1987 [JP] Japan .................................. 62-277150

[51] Int. Cl.$^5$ ............................................ C04B 35/64
[52] U.S. Cl. ...................................... 264/56; 264/27; 264/332
[58] Field of Search ............................ 264/56, 332, 27

[56] References Cited

FOREIGN PATENT DOCUMENTS 165707 12/1985 European Pat. Off. .
WO86/4890 8/1986 PCT Int'l Appl. .

OTHER PUBLICATIONS

Ceramic Engineering and Science, vol. 4, No. 7/8, 1983, pp. 624–633.

Primary Examiner—James Derrington
Attorney, Agent, or Firm—Wenderoth, Lind & Ponack

[57] ABSTRACT

The present invention relates to a pressure self-combustion sintering method for obtaining a ceramic sintered body.

Conventionally, in order to sinter ceramics by the pressure self-combustion sintering method, a mixture comprising metallic elements and non-metallic elements has been inserted into an airtight vessel and then a filament formed of W, Mo and the like as a heat source for starting a reaction has been placed within said airtight vessel followed by heating by adding energy to this heat source from outside of the airtight vessel and applying an isostatic pressure to the mixture comprising metallic elements and non-metallic elements to start a synthetic reaction of ceramics from one end of said mixture, thereby carrying out a chain synthetic sintering of ceramics by a reaction heat.

However, this method requires drawing a power supply lead wire formed of a filament made of W, Mo and the like out of the airtight vessel for the filament formed of W, Mo and the like placed within the airtight vessel while maintaining a airtightness. It has been said that this is remarkably difficult industrially. Accordingly, the pressure self-combustion sintering method has never been practically used industrially.

The present invention was achieved by finding that the problems of the conventional method can be solved by covering an exterior of the airtight vessel, into which the mixture comprising metallic elements and non-metallic elements is inserted, with the mixture comprising metallic elements and non-metallic elements in place of using the filament formed of W, Mo and the like as the heat source, that is ignition agent.

7 Claims, 1 Drawing Sheet

PRESSURE SELF-COMBUSTION SINTERING METHOD

DETAILED DESCRIPTION OF THE INVENTION

1. Field of the Invention

The present invention relates to a pressure self-combustion sintering method for easily obtaining a ceramic sintered body.

2. Prior Art

A method of easily obtaining a ceramic sintered body includes a self-combustion sintering method, in which ceramics are simultaneously synthesized and sintered by the use of a reaction heat generated in the synthesis of ceramics from a mixture comprising metallic elements and non-metallic elements, as disclosed in Japanese Patent Laid-Open No. Sho 60-246,270. In particular, in this Japanese Publication it is said that a so-called pressure self-combustion sintering method conducted under pressure by means of a hot isostatic press (hereinafter referred to as HIP) is preferably used.

PROBLEMS TO BE SOLVED BY THE INVENTION

Conventionally, in order to sinter ceramics by the pressure self-combustion sintering method, a mixture comprising metallic elements and non-metallic elements is inserted into an airtight vessel and then a filament formed of W, Mo and the like as a heat source for starting a reaction is placed within said airtight vessel followed by heating by adding an energy to this heat source from outside of the airtight vessel and applying an isostatic pressure to the mixture comprising metallic elements and non-metallic elements to start a synthetic reaction of ceramics from one end of said mixture, thereby carrying out a chain sintering of ceramics by a reaction heat.

As a rule, a filament formed of W, Mo and the like is used as the heat source. However, in order to use a HIP method, which is most general as a pressure means in the pressure self-combustion sintering method, an isostatic presure is applied to the mixture comprising metallic elements and non-metallic elements so that it s indispensable to insert the mixture comprising metallic elements and non-metallic elements into the airtight vessel. Accordingly, it is indispensable to place the filament formed of W, Mo and the like within this airtight vessel and draw a power supply lead wire formed of the filament made of W, Mo and the like out of the airtight vessel while maintaining the airtightness. A tube formed of glass, silica, platinum and the like is generally recommended as a material for use in the airtight vessel.

It has been remarkably difficult industrially to draw the lead wire out of the airtight vessel while holding the filaments formed of W, Mo and the like airtight within the airtight vessel, and it has been said that this is one of the important reasons why the pressure self-combustion sintering method has not yet been practically used industrially.

CONSTRUCTION OF THE INVENTION

According to the present invention, ceramics are synthesized and sintered by the use of a reaction heat generated in the synthesis of ceramics from a mixture comprising metallic elements and non-metallic elements by the pressure self-combustion sintering method, one end of the mixture comprising metallic elements and non-metallic elements disposed outside of an airtight vessel, into which a mixture comprising metallic elements and non-metallic elements has been inserted, being heated to bring about a so-called self-combustion reaction, in which a chain reaction is made to progress, the mixture comprising metallic elements and non-metallic elements within the airtight vessel being instantaneously heated by the reaction heat thus generated to start a reaction of synthesizing ceramics from said mixture comprising metallic elements and non-metallic elements, and a chain synthesis and sintering of ceramics being brought about by the reaction heat.

Figure 1:
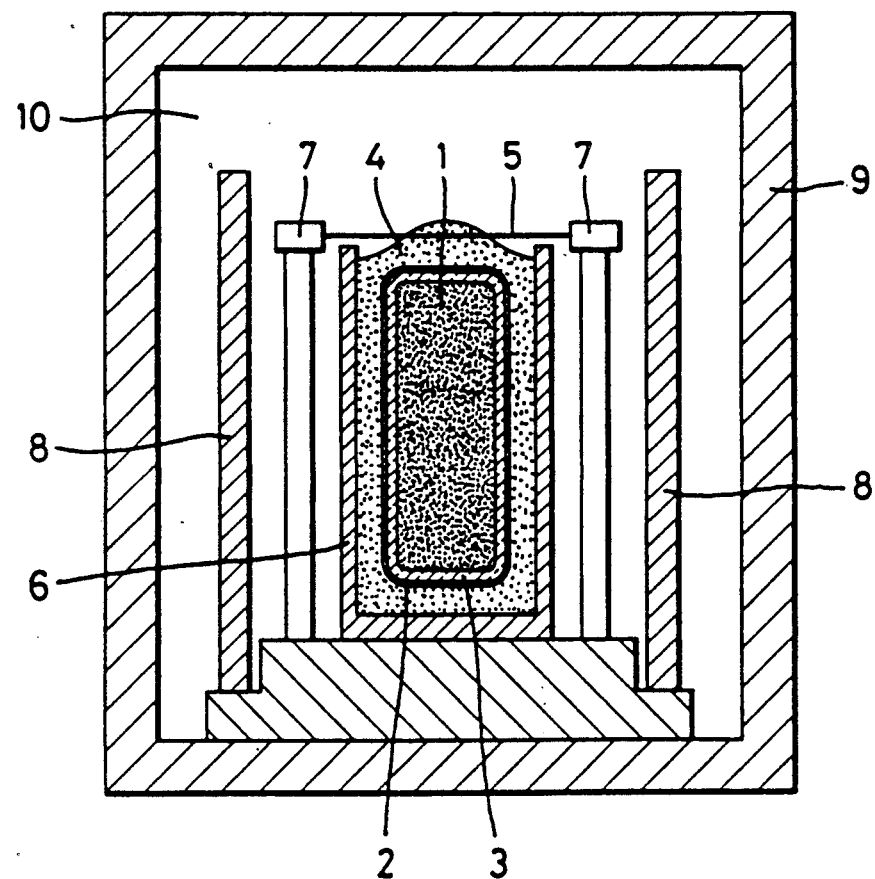
FIG. 1 is a schematic drawing showing one example of a HIP apparatus to be used in the pressure self-combustion sintering method of the present invention.

In the drawing, reference numeral 1 designates reactant consisting of a mixture of metallic elements and non-metallic elements inserted into an a airtight vessel 3, and 6 is a carbon case. The heat source, that is, ignition agent 4, is filled between the airtight vessel 3 and the carbon case 6. Reference numeral 5 designates an ignition heater between electrodes 7, 7, reference numeral 9 designates HIP vessel, and 8 is designates HIP heater.

HIP apparatus as above is filled with reactant, and the ignition agent functions in the following way: Interior 10 of the HIP vessel is first converted to a high-pressure gaseous atmosphere with a temperature of 500°–1200° C., an electric current being applied to an ignition heater 5 from an exterior electrode (not shown) via electrodes 7, 7 which is then heated. With that heater, ignition, agent 4 (for example a composite of Ti and C) is ignited, thus starting a self-combustion reaction. This reaction finishes in a moment causing high temperature around reactant 1, thus starting a self-combustion reaction.

OPERATION

As above described, according to the present invention, the self-combustion reaction of the mixture comprising metallic elements and non-metallic elements disposed outside of the airtight vessel, into which the mixture comprising metallic elements and non-metallic elements was inserted, is used as a heat source, that is, an ignition agent, for starting the reaction in the pressure self-combustion sintering method.

Accordingly, it goes without saying that it is not required to dispose the filaments formed of W, Mo and the like within the airtight vessel formed of glass and silica, drawing the lead wire out of the airtight vessel while the airtight is maintained as in the prior art. In addition, the heating method for starting self-combustion reaction of the mixture, that is an ignition agent, comprising metallic elements and non-metallic elements disposed outside of the airtight vessel, does not require the sintering of the mixture comprising metallic elements and non-metallic elements, that is, pressurization, so that an industrially very difficult heat source such as the disposition of the filaments within the airtight vessel while the airtightness is maintained, is not required, but rather merely direct heating by means of simple filaments and the like is enough.

In the above, the heat source, that is, ignition agent, becomes most effective when it is 1.0 or more in thickness than that of the airtight vessel for heat transmission to the interior through the airtight vessel. Filling density of the ignition agent is considered appropriate when it is 20-70% of its theoretical density, because in case it is less than 20%, enough ignition can not be expected, and furthermore a mixture of metallic elements and non-metallic elements is hard to be compressed to more than 70%.

In order to obtain better release at the time of completion of sintering, it is preferable to coat a release agent (2 in FIG. 1) like BN, or $MoS_2$ around the airtight vessel.

For a mixture of the metallic elements and non-metallic elements used as the heat source, that is, ignition agent, for starting a reaction, a combination of Ti—C, Zr—B, Nb—B, Nb—C, Si—C, Si—N, Ti—N, Al—N, Nb—N may preferably be used. Among these, N is nitrogen gas to keep the interior of the HIP vessel under a high-pressure atmosphere, and contributes to the reaction.

Accordingly, for a mixture of the metallic elements and non-metallic elements for use in the present invention, a mixture of the metallic elements and gas as above, may also preferably be used.

In addition, the present invention relates to a method of synthesizing and sintering an objective compound by the use of the formation reaction heat of said compound, so that it goes without saying that a starting material, which can generate a sufficient reaction heat, is enough. The synthesis and sintering of ceramics from the mixture comprising metallic elements and non-metallic elements are in particular preferable. At least one kind of metallic elements selected from the group consisting of metallic elements of the groups IIIa, IVa, Va and VIa in the periodic table and at least one of non-metallic elements selected from the group consisting of B, C, N, and Si are preferably used because sufficient formation reaction heat can be obtained. In addition, although a uniaxial press, such as hot press, may be used as the pressing method, the hot isostatic press (HIP) is preferably used industrially.

EXAMPLE 1

55.62 g of commercially available Ti powders and 10.81 g of commercially available B powders g were sufficiently mixed in a ball mill and then molded under pressure in a press followed by enclosing the molded mixtures in a vessel made of Pyrex glass in a vacuum. This sample was placed in a carbon case and the circumference of said vessel made of Pyrex glass was covered with a powdery mixture comprising Ti powders and C powders at an equal molar ratio. This carbon case was placed in a HIP and then the HIP was evacuated followed by heating the inside of the HIP to 700° C. Subsequently, Ar gas was introduced into the HIP to a pressure of 400 atm. The pressure self-combustion sintering of Ti and B was carried out by electrifying W filaments previously prepared in the Ti and C powders within the carbon case from outside of the HIP.

A sintered body having a composition of $TiB_2$ — 10 wt % Ti and a theoretical density of about 99.8% was obtained. According to the prior art, it has been required to mount the W filaments on said vacuum vessel by a so-called hermetic seal (glass and a metal are spliced to each other while maintaining the vacuum) when the pressed powdery mixture comprising Ti powders and B powders is enclosed in the vessel made of Pyrex glass. Therefore, the yield has been remarkably reduced industrially. For example, of 100 tests merely 92 tests were successful. On the other hand, according to the present invention, a process such as hermetic sealing, which is industrially inferior in yield, is not required, so that of 100 test, 100 were successful.

EXAMPLE 2

28 g of commercially available Si powders and 12 g of commercially available C powders were sufficiently mixed and then the resulting mixture was molded under pressure to prepare pressed powders. These pressed powders enclosed in a vacuum vessel made of platinum in a vacuum and then the circumference of the vacuum vessel was covered with a powdery mixture comprising Ti powders and C powders at an equal molar ratio, followed by placing the covered vessel in a carbon case. This carbon case was housed in the HIP and was heated at 1,000° C. Subsequently, Ar gas was introduced into the HIP and the inside of the HIP was pressurized to 450 atm.

Subsequently, the pressure self-combustion sintering was carried out by electrifying W filaments previously prepared in the Ti powders and C powders within the carbon case from outside of the HIP. As a result, a sintered body of SiC having a theoretical density of 99.9% was obtained.

EXAMPLE 3

240 g commercially available $TiO_2$ an having anatase type crystalline structure, 108 g of commercially available Al powders and 36 g commercially available C powders were sufficiently mixed and then the resulting powdery mixture was moded under pressure to obtain pressed powders.

The resulting pressed powders were enclosed in a vessel made of Pyrex glass in a vacuum and then the vessel made of Pyrex glass was placed in a carbon case. Subsequently, the circumference of said vessel made of Pyrex glass was covered with a powdery mixture comprising Ti Powders and B powders at a molar ratio of 1:2.

The carbon case was placed in a HIP and then heated to 88° C. followed by introducing Ar gas thereinto until a pressure of 450 atm was reached.

The pressure self-combustion sintering was carried out by electrifying W filaments previously prepared in the powdery mixture comprising Ti powders and B powders within the carbon case from outside of the HIP.

As a result, a sintered body of $Al_2O_3$—Tic composite ceramics having a theoretical density of 97.2% was obtained.

EFFECTS

As above described, the used of the method according to the present invention led to the possibility of industrially applying the pressure self-combustion sintering method.

We claim:

1. A method of synthesizing and sintering ceramics using heat of formation of said ceramics under pressure, which comprises pressing and inserting a mixture of metallic and non-metallic elements comprising said ceramics inside a vessel, vacuum sealing said vessel to render said vessel airtight, placing another mixture comprising metallic elements and non-metallic elements which have sufficient heat of formation around the outside of said airtight vessel, placing the resultant assembly in a pressure vessel and heating said assembly to a temperature below the starting point of combustion synthesis simultaneously or before applying pressure, heating one and of said outside mixture to generate heat of formation caused by a chain reaction of said outside mixture to the other end thereof, and heating said inside mixture through the airtight vessel by said heat of formation from said outside mixture to start reaction under pressure to synthesize and sinter said ceramics.

2. A method as set forth in claim 1, wherein at least one metal selected from the group consisting of metals of the groups IIIa, IVa, Va and VIa in the periodic table is used as said metallic elements.

3. A method as set forth in claim 1, wherein at least one member selected from the group consisting of B, C, N and Si is used as said non-metallic elements.

4. A method as set forth in claim 1, wherein said pressure vessel is a hot isostatic press.

5. A method as set forth in claim 1, wherein said another mixture is compressed to a density of 20-70% of its theoretical density.

6. A method as set forth in claim 1, wherein said another mixture is placed around said airtight vessel in a thickness which is the same as or more than the thickness of said airtight vessel.

7. A method as set forth in claim 2, wherein said pressure vessel is a hot isostatic press.

* * * * *